(12) United States Patent
Kim

(10) Patent No.: US 7,946,646 B2
(45) Date of Patent: May 24, 2011

(54) WHEEL HOUSE STRUCTURE FOR VEHICLE

(75) Inventor: Sung Won Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 198 days.

(21) Appl. No.: 12/464,702

(22) Filed: May 12, 2009

(65) Prior Publication Data

US 2010/0078970 A1    Apr. 1, 2010

(30) Foreign Application Priority Data

Oct. 1, 2008    (KR) ................. 10-2008-0096771

(51) Int. Cl.
*B60J 7/00*    (2006.01)
(52) U.S. Cl. ...................................... 296/198
(58) Field of Classification Search .............. 296/198, 296/203.04, 187.09, 187.12, 203.03, 204, 296/156; 273/142 R, 142 E, 274
See application file for complete search history.

(56) References Cited

U.S. PATENT DOCUMENTS

| | | | | |
|---|---|---|---|---|
| 2,474,992 | A | * | 7/1949 | Stephenson et al. .......... 296/198 |
| 2,611,628 | A | * | 9/1952 | Schatzman .................... 280/848 |
| 3,368,826 | A | * | 2/1968 | Whitesell ....................... 280/848 |
| 4,440,438 | A | * | 4/1984 | Miyoshi et al. .......... 296/203.04 |
| 6,155,624 | A | * | 12/2000 | Bienenstein, Jr. ........... 296/37.1 |
| 6,641,194 | B2 | * | 11/2003 | Fujii et al. ..................... 296/39.3 |
| 7,021,703 | B2 | * | 4/2006 | Yamaguchi et al. ..... 296/203.04 |
| 7,086,692 | B2 | * | 8/2006 | Sebastian ...................... 296/198 |
| 7,380,869 | B2 | * | 6/2008 | Nakaya ....................... 296/180.1 |
| 7,448,468 | B2 | * | 11/2008 | Czerny et al. ................. 181/210 |
| 2003/0220034 | A1 | * | 11/2003 | Ochs .............................. 442/76 |
| 2005/0242625 | A1 | * | 11/2005 | Hafner et al. ............ 296/193.05 |
| 2008/0007093 | A1 | * | 1/2008 | Andou et al. ............. 296/193.08 |

* cited by examiner

*Primary Examiner* — Kiran B. Patel
(74) *Attorney, Agent, or Firm* — Morgan, Lewis & Bockius LLP

(57) ABSTRACT

A wheel house structure for a vehicle, in which a wheel house is assembled with a rear floor assembly. The wheel house of the wheel house structure includes a front wheel house having a first convex portion at one end thereof, and a rear wheel house having a second convex portion at one end thereof, wherein the first and second convex portions are coupled to be overlapped each other to form a beam between the front wheel house and the second wheel house inward the wheel house.

12 Claims, 5 Drawing Sheets

WHEEL HOUSE STRUCTURE FOR VEHICLE

CROSS-REFERENCE TO RELATED APPLICATION

The present application claims priority to Korean Patent Application Number 10-2008-0096771 filed Oct. 1, 2008, the entire contents of which application is incorporated herein for all purposes by this reference.

BACKGROUND OF THE INVENTION

1. Field of the Invention

The present invention relates to a wheel house structure for a vehicle, the wheel house structure having a box-shaped space.

2. Description of Related Art

The rigidity of the body mounting part of a vehicle suspension affects the noise, vibration and harshness (NVH) of a vehicle, and the running and handling performance of the vehicle.

As shown in FIGS. 1A and 1B, a conventional wheel house 10 for a vehicle is provided with various brackets 20 to attach assembly parts to the wheel house 10. A mounting bracket 11 to which a rear shock absorber is mounted is welded to the lower surface of the wheel house 10. After a rear side member 40 is coupled to a rear floor 30, the wheel house 10 is coupled to the assembly of the rear side member 40 with the rear floor 30. Further, as shown in FIGS. 2A and 2B, the wheel house 10 may be also provided with a reinforcing member 20' to increase strength when the wheel house 10 is mounted to the suspension.

In the conventional wheel house, however, as the forming depth of the wheel house is increased during the forming of a product, the wheel house may be broken or develop creases, so that formability may deteriorate. Further, the durability of the product may be reduced because of vibrations between the wheel house 10 and the rear floor suspension, and a NVH level may become elevated because of the lack of strength of the wheel house. Furthermore, in order to mount an assembly part to the wheel house, an additional mounting bracket having an assembly hole must be mounted to the wheel house, thus inconveniencing a manufacturer.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a wheel house structure for a vehicle, which is capable of increasing the strength of a wheel house and improving formability.

In an aspect of the present invention, the wheel house structure for a wheel house of a vehicle, may include a front wheel house having a first convex portion at one end thereof, and a rear wheel house having a second convex portion at one end thereof, wherein the first and second convex portions are coupled to be overlapped each other to form a beam between the front wheel house and the second wheel house inward the wheel house.

At least a box-shaped space may be provided within the beam formed between the front wheel house and the rear wheel house.

The second convex portion of the rear wheel house may include a first protruding portion protruding inward the rear wheel house to form the beam.

In another aspect of the present invention, the wheel house structure may further include a second protruding portion protruding outward the rear wheel house, wherein the first convex portion of the front wheel house is coupled to the second protruding portion of the rear wheel house, wherein an assembly hole is formed in the second protruding portion of the second convex portion to directly mount an assembly part.

A welding portion may be formed along an edge of the first convex portion and welded to the second protruding portion of the second convex portion wherein the welding portion of the first convex portion is welded to the rear wheel house.

A welding portion may be formed along an edge of the first convex portion of the front wheel house and welded to the second convex portion of the second wheel house wherein the welding portion of the first convex portion is welded to the rear wheel house.

The space may be vertically provided along the beam of the front and rear wheel houses, wherein the front wheel house and the rear wheel house are coupled to each other to provide a semi-circular wheel house.

An assembly hole may be formed in the second convex portion to directly mount an assembly part.

A first surface of the wheel house may be formed to be convex, and a mounting space for a rear shock absorber may be formed in a second surface of the wheel house.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 1B is a sectional view taken along line "A-A" of FIG. 1a.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
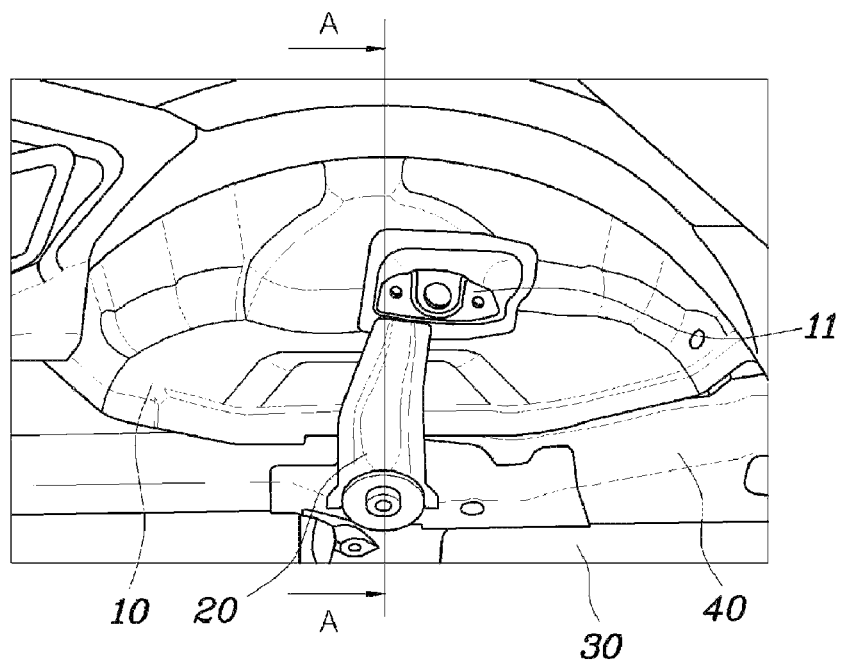
FIG. 1A is a view illustrating the construction of a conventional wheel house for a vehicle.
Figure 1B:
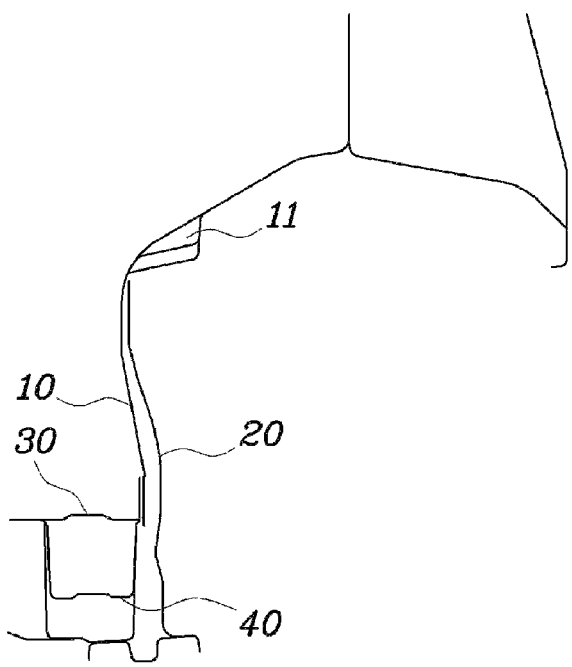
Figure 2A:
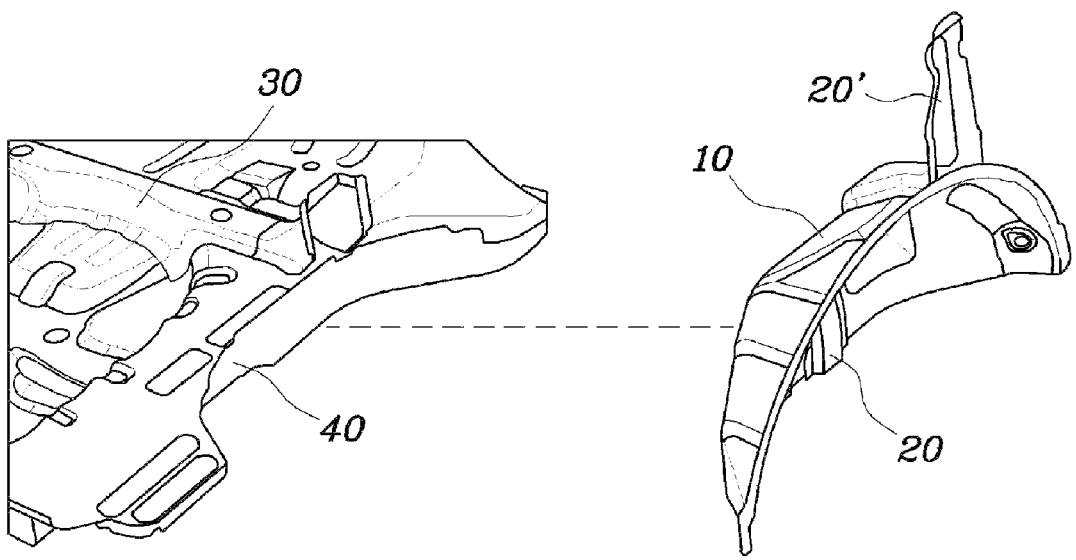
FIG. 2A is an exploded perspective view illustrating the conventional wheel house which is separated from a floor panel.
Figure 2B:
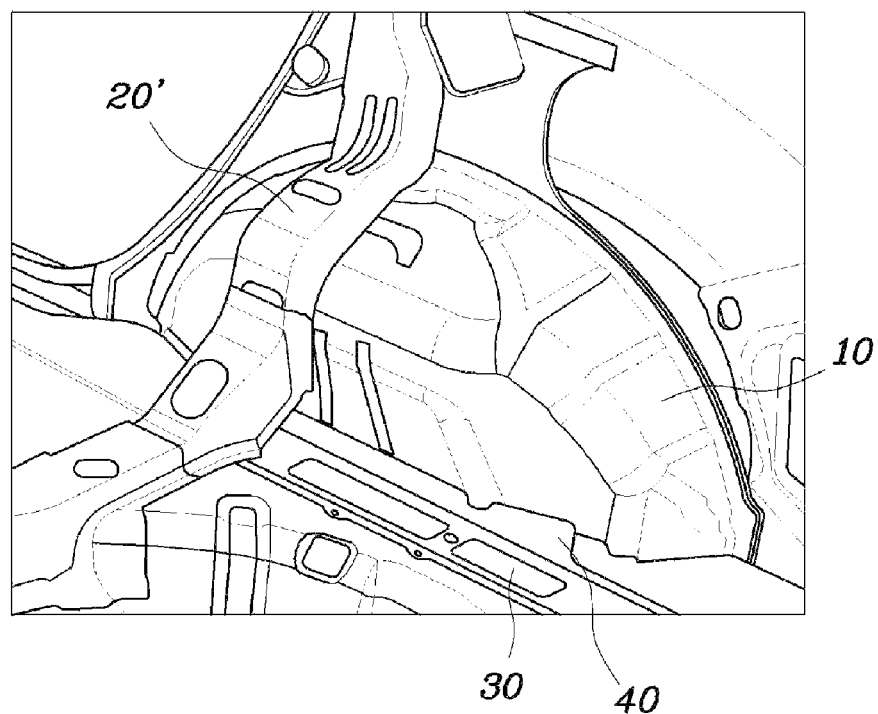
FIG. 2B is a perspective view illustrating the conventional wheel house which is coupled to the floor panel.
Figure 3:
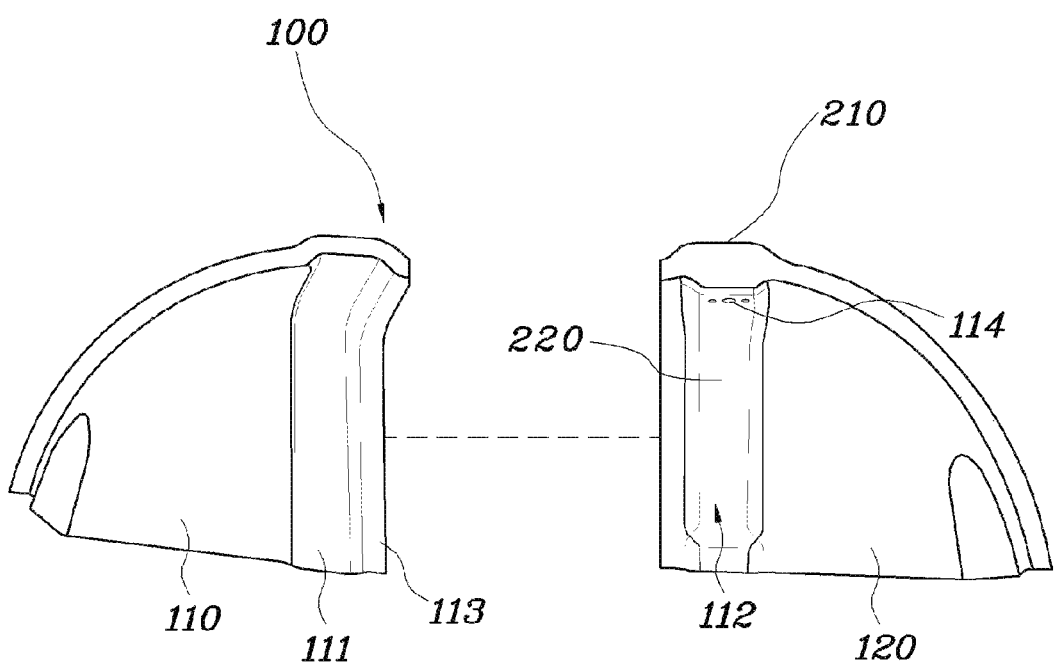
FIG. 3 is an exploded perspective view illustrating an exemplary wheel house structure for a vehicle according to the present invention.
Figure 4:
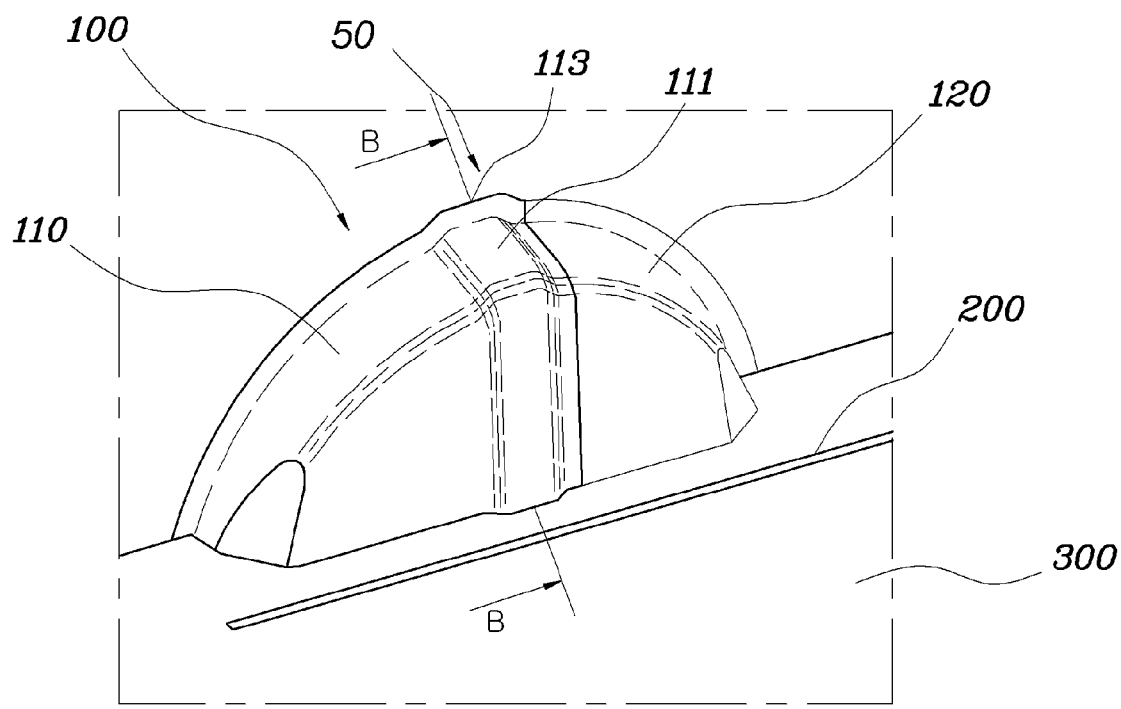
FIG. 4 is a perspective view illustrating the assembled state of the exemplary wheel house structure according to the present invention.
Figure 5:
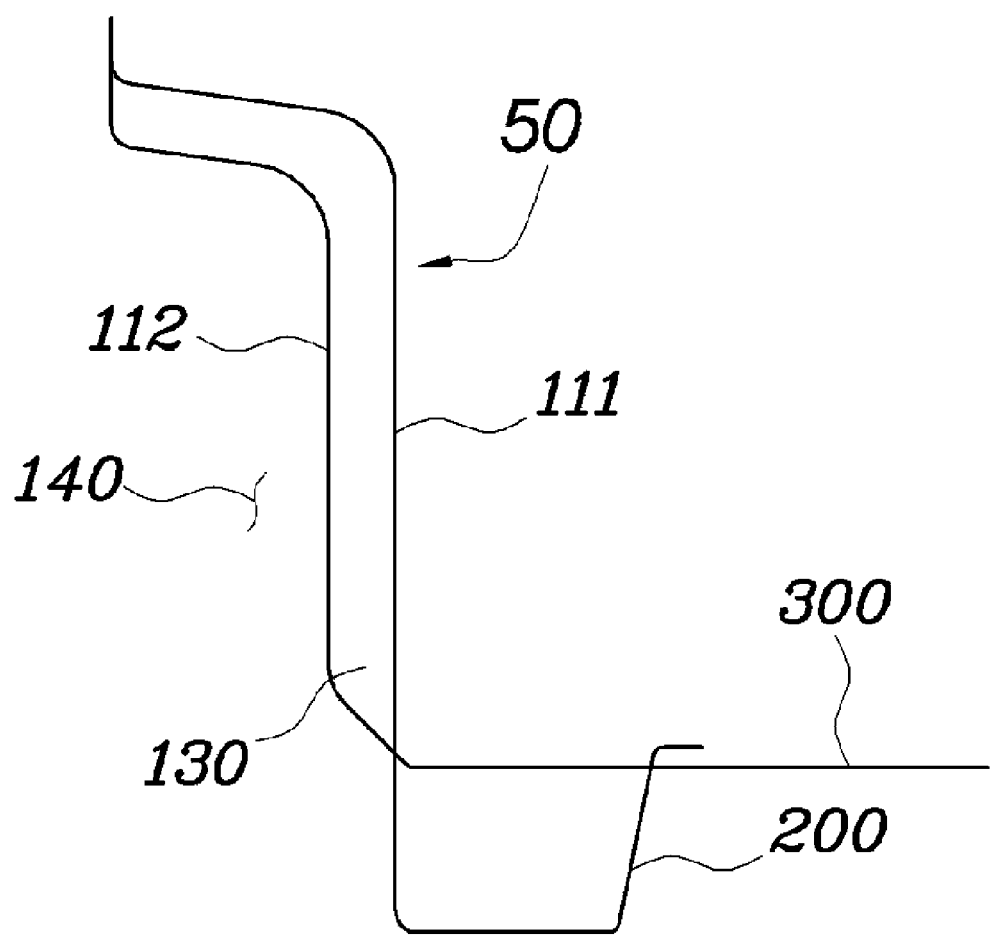
FIG. 5 is a sectional view taken along line "B-B" of FIG. 4.

As shown in FIGS. 3 to 5, a wheel house structure for a vehicle according to an exemplary embodiment of the present invention is characterized in that a box-shaped space 130 is formed in the overlapping portion of a front wheel house 110 with a rear wheel house 120, thus attenuating the vibrations of the suspension and increasing the strength of the suspension.

In achieving these characteristic features, the wheel house structure of various embodiments of the present invention is constructed as follows. That is, the wheel house structure is assembled with a rear floor assembly having a rear floor 300 and a rear side member 200. Here, since the structures of the rear floor 300 and the rear side member 200 are equal to those of a rear floor and a rear side member assembled with a conventional wheel house, the detailed description of the components will be omitted herein.

According to various embodiments of the present invention, the wheel house structure includes the front wheel house 110 having on one surface thereof a first convex portion 111, and the rear wheel house 120 having on one surface thereof a second convex portion 112. The front wheel house 110 and the rear wheel house 120 are coupled to each other such that the first convex portion 111 and the second convex portion 112 overlap each other.

To this end, in various embodiments of the present invention, the second convex portion 112 may include first and second protruding portions 210 and 220, wherein the first protruding portion 210 protrudes inward the wheel house and the second protruding portion 220 protrudes outward the wheel house. The first convex portion 111 of the front wheel house 110 is constructed to surround the second protruding portion 220 of the second convex portion 112 of the rear wheel house 120.

The box-shaped space 130 is formed between the first and second convex portions 111 and 112 which are coupled to each other in the above-mentioned manner. That is, beam 50 is formed between the first convex portion 111 of the front wheel house 110 and the second convex portion 112 of the rear wheel house 120, so that a space 130 of a predetermined height is formed between the first and second convex portions 111 and 112.

The space 130 is enclosed and sealed by the other surface of the front wheel house 110 and one surface of the rear wheel house 120. The space 130 may include two spaces formed in the forward direction and rearward direction of the vehicle with respect to the beam 50. Thus, the space 130 attenuates the vibrations of the vehicle suspension, increases the strength of the suspension, and prevents an increase in a NVH level resulting from the lack of strength of a vehicle body.

An assembly hole 114 may be formed in the second convex portion 112 to directly mount an assembly part. Since the assembly hole 114 is formed in the second convex portion 112 which overlaps with the first convex portion 111 of the wheel house 100, the assembly part can be mounted to the wheel house 100 without an additional mounting bracket.

The first and second convex portions 111 and 112 are coupled to each other through welding. To this end, a welding portion 113 is formed on the edge of the first convex portion 111 which is coupled to the second convex portion 112 through welding. The welding portion 113 couples the front wheel house 110 with the rear wheel house 120.

As such, the wheel house 100 manufactured by welding the front wheel house 110 to the rear wheel house 120 has a semi-circular shape. Here, one surface of the wheel house 100 is convex, and the other surface is concave so as to form a mounting space 140 for a shock absorber. The first convex portion 111 of the front wheel house 110 and the second convex portion 112 of the rear wheel house 120 extends vertically, so that the box-shaped space 130 extends vertically in the central portion of the wheel house 100.

As described above, various embodiments of the present invention provide for a wheel house structure for a vehicle, in which a box-shaped space is formed in the front and rear portions of the overlapping portion of a front wheel house with a rear wheel house, thus preventing the wheel house from being broken or creased as the forming depth of the conventional wheel house increases and thereby affording superior formability, attenuation of the vibration of a vehicle suspension, increased strength of the suspension, and prevention of an increase in the NVH level for lack of strength of a vehicle body.

The present invention provides a wheel house structure for a vehicle, which allows an assembly hole to be directly formed in a wheel house, so that an additional mounting bracket having an assembly hole is not required to mount an assembly part, thus reducing the cost and weight of a product and the number of assembly processes.

For convenience in explanation and accurate definition in the appended claims, the terms "front" or "rear", "forward", "rearward" and "vertical" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel house structure for a wheel house of a vehicle, comprising:

a front wheel house having a first convex portion at one end thereof; and a rear wheel house having a second convex portion at one end thereof;

wherein the first and second convex portions are coupled to overlap each other to form a beam between the front wheel house and the rear wheel house.

2. The wheel house structure as set forth in claim 1, wherein a space is provided between the front wheel house and the rear wheel house.

3. The wheel house structure as set forth in claim 1, wherein the second convex portion of the rear wheel house includes a first protruding portion protruding inward the rear wheel house to form the beam.

4. The wheel house structure as set forth in claim 3, further comprising a second protruding portion protruding outward the rear wheel house, wherein the first convex portion of the front wheel house is coupled to the second protruding portion of the rear wheel house.

5. The wheel house structure as set forth in claim 4, wherein an assembly hole is formed in the second protruding portion of the second convex portion.

6. The wheel house structure as set forth in claim 3, wherein a welding portion is formed along an edge of the first convex portion and welded to the second protruding portion of the second convex portion.

7. The wheel house structure as set forth in claim 3, wherein the welding portion of the first convex portion is welded to the rear wheel house.

8. The wheel house structure as set forth in claim 1, wherein a welding portion is formed along an edge of the first convex portion of the front wheel house and welded to the second convex portion of the second wheel house.

9. The wheel house structure as set forth in claim 1, wherein the welding portion of the first convex portion is welded to the rear wheel house.

10. The wheel house structure as set forth in claim 2, wherein the space is vertically provided along the beam of the front and rear wheel houses.

11. The wheel house structure as set forth in claim 10, wherein the front wheel house and the rear wheel house are coupled to each other to provide a semi-circular wheel house.

12. The wheel house structure as set forth in claim 1, wherein an assembly hole is formed in the second convex portion.

* * * * *